(12) United States Patent
Grossetie et al.

(10) Patent No.: US 6,344,909 B1
(45) Date of Patent: Feb. 5, 2002

(54) METHOD AND DEVICE FOR HOLOGRAM SYNTHESIS

(75) Inventors: Jean-Claude Grossetie, Ispra (IT); Pierre Noirard, Lipsheim (FR)

(73) Assignee: European Community, Luxembourg (LU)

( * ) Notice: Subject to any disclaimer, the term of this patent is extended or adjusted under 35 U.S.C. 154(b) by 0 days.

(21) Appl. No.: 09/530,967

(22) PCT Filed: Nov. 17, 1998

(86) PCT No.: PCT/EP98/07539

§ 371 Date: May 19, 2000

§ 102(e) Date: May 19, 2000

(87) PCT Pub. No.: WO99/27422

PCT Pub. Date: Jun. 3, 1999

(30) Foreign Application Priority Data

Nov. 20, 1997 (EP) .............................. 97402798

(51) Int. Cl.[7] ................................. G03H 1/08
(52) U.S. Cl. ............................... 359/9; 359/35
(58) Field of Search ........................ 359/9, 35

(56) References Cited

U.S. PATENT DOCUMENTS 5,347,375 A * 9/1994 Saito et al. .................. 359/9
5,668,648 A * 9/1997 Saito et al. .................. 359/9

OTHER PUBLICATIONS

Michelin S et al: "Fourier–Transform Computer–Generated Hologram: a Variation on the Off–Axis Principle", Practical Holography VIII, San Jose, Ca, Feb. 1994, vol. 2176, pp. 249–254.

Leseberg D: "Computer–Generated Three–Dimensional Image Holograms", Applied Optics, vol. 31, No. 2, Jan. 1992, pp. 223–229.

P. Hariharan: *Optical Holography* pp. 146–155. Cambridge University Press, 1984.

* cited by examiner

*Primary Examiner*—Darren Schuberg
(74) *Attorney, Agent, or Firm*—Bacon & Thomas

(57) ABSTRACT

The method consists of transforming a digital two-dimensional image defined by a real function into a complex two-dimensional image defined by a complex function, oversampling the complex image, simulating the production of a diffracted image resulting from the diffraction of an optical wave by the oversampled complex image, and adding a complex field representing a reference optical wave to the resulting diffracted image to produce a hologram. The hologram produced in this way can be used to produce images in three dimensions or in telecommunications.

32 Claims, 3 Drawing Sheets

METHOD AND DEVICE FOR HOLOGRAM SYNTHESIS

The present invention relates generally to synthesizing holograms and more particularly to synthesizing holograms digitally from two-dimensional images stored in a memory.

Digital synthesis of holograms from two-dimensional images is used in methods of reproducing three-dimensional images, for example. Respective holograms are computed for two-dimensional digital images representing a three-dimensional object from different viewpoints. These holograms are then combined to produce a hologram of the object which reproduces a three-dimensional image of the object when it is reproduced physically by a spatial light modulator and illuminated by a coherent wave.

There are other applications of digital synthesis of holograms, in particular in telecommunications, radar, X-rays and sonar.

Digital techniques for synthesizing holograms are known in the art. For example, the article by S. Michelin et al. entitled "Fourier-transform computer generated hologram: a variation on the off-axis principle" published in SPIE Conferences 1994, Practical Holography VIII, pages 249–254, describes a method of simulating the production of an analog hologram. The method consists of applying a Fourier transform to a two-dimensional image, adding a complex field representing a reference optical wave to the Fourier transform obtained in this way, and then extracting the amplitude information contained in the sum of the complex field and the Fourier transform. Applying the Fourier transform to the two-dimensional image digitally simulates the production of a "diffracted" image which results from the diffraction of a fictitious optical wave by the two-dimensional image. The two-dimensional image is also oversampled before the Fourier transform is applied to it. However, the oversampled two-dimensional image obtained in this way is defined by a real intensity distribution which is not always well suited to computing a complex transform such as a Fourier transform.

The present invention aims to provide a method of synthesizing holograms that is more efficient than those of the prior art.

To this end, a method of producing a hologram from a two-dimensional image defined by a real function is characterized in that it comprises the following steps:

transforming the two-dimensional image defined by said real function into a complex two-dimensional image defined by a complex function, oversampling the complex image, simulating the production of a diffracted image resulting from the diffraction of an optical wave by the oversampled complex image, and adding a complex field representing a reference optical wave to the resulting diffracted image in order to produce said hologram.

The method can further comprise the step of encoding values taken by the amplitude of the sum of said complex field and the resulting diffracted image, so that the hologram can be reproduced on a liquid crystal screen or transmitted over a transmission line, for example.

In the present context, a "real or complex function" means a function of two variables, in the form of digital data, and taking real or complex values, respectively. The real function is typically an intensity distribution while the complex function is a distribution of complex numbers each defined by a real amplitude and a real phase.

The step of transforming the given two-dimensional image into a complex image derives from the original two-dimensional image an image which is defined by complex numbers which optimally represent the real optical field and facilitate the computations employed in the simulation step.

The oversampling step increases the number of pixels of the hologram because the computations employed in subsequent steps apply to a greater number of image points. This step can consist of inserting the complex image into a larger image in which the intensity of pixels outside the original complex image is made equal to 0. In this case, implementing the step of oversampling the complex image after the steps of transforming the two-dimensional image into a complex image avoids having to calculate the complex function for points of the oversampled image outside the original complex image.

The transform step typically includes the following steps:

determining amplitude values each depending on the square root of a corresponding value taken by said real function, and associating a phase with each of said amplitude values so that an amplitude value and a phase value are defined for each point of the complex image.

By averaging the amplitude values of the hologram, associating a phase with each amplitude value avoids peaks of excessively high amplitude in the resulting hologram of the given two-dimensional image.

The simulation step can include computing one of the following complex transforms: Fourier transform, Walsh transform, Hankel transform, orthogonal polynomial transform, Hadamar transform, Karhunen-Loeve transform, multiresolution discrete wavelet transform, adaptive wavelet transform and a transform which is a composite of at least two of the above transforms.

The simulation step advantageously consists of computing a convolutional product, associated with the oversampled complex image, of two components, by applying the transform which is the inverse of said complex transform to the product of the respective complex transforms of said two components.

Until now, the skilled person has regarded the Fourier transform, which is widely used in optics, as the best possible transform for calculating a convolutional product of this kind. However, experiments conducted by the present inventors have shown that using one of the complex transforms mentioned above other than the Fourier transform produces, for a two-dimensional image, a resultant hologram of much better quality, i.e. which, when it is reproduced physically and illuminated by a coherent source, produces an image associated with the two-dimensional image that is finer than those generally produced by prior art systems.

According to another aspect of the invention, a method of producing a hologram from a two-dimensional image defined by a real function is characterized in that it comprises the following steps:

oversampling the two-dimensional image, transforming the oversampled two-dimensional image into a complex two-dimensional image defined by a complex function, simulating the production of a diffracted image resulting from the diffraction of an optical wave by the oversampled complex image, and adding a complex field representing a reference optical wave to the resulting diffracted image to produce said hologram.

The invention also provides a system for producing a hologram from a two-dimensional image defined by a real function, characterized in that it comprises:

transform means for transforming the two-dimensional image defined by said real function into a complex two-dimensional image defined by a complex function, means for oversampling the complex image, simulator means for simulating the production of a diffracted image resulting from the diffraction of an optical wave by the oversampled complex image, and means for adding a complex field representing a reference optical wave to the resulting diffracted image to produce said hologram.

The system can further comprise means for encoding values taken by the amplitude of the sum of said complex field and the diffracted image.

The transform means can comprise means for determining amplitude values each depending on the square root of the corresponding value taken by said real function and means for associating a phase with each of said amplitude values so that an amplitude value and a phase value are defined for each point of the complex image.

The simulator means can comprise means for computing one of the following complex transforms: Fourier transform, Walsh transform, Hankel transform, orthogonal polynomial transform, Hadamar transform, Karhunen-Loeve transform, multiresolution discrete wavelet transform, adaptive wavelet transform and a transform which is a composite of at least two of the above transforms.

The simulator means advantageously comprise means for computing a convolutional product, associated with the oversampled complex image, of two components, by applying the transform which is the inverse of said complex transform to the product of the respective complex transforms of said two components.

According to another aspect of the invention, a system for producing a hologram from a two-dimensional image defined by a real function is characterized in that it comprises:

means for oversampling the two-dimensional image, transform means for transforming the oversampled two-dimensional image into a complex two-dimensional image defined by a complex function, simulator means for simulating the production of a diffracted image resulting from the diffraction of an optical wave by the oversampled complex image, and means for adding a complex field representing a reference optical wave to the resulting diffracted image to produce said hologram.

Other advantages of the present invention will become apparent on reading the following detailed description with reference to the accompanying drawings, in which:

FIG. 1 shows an algorithm of the invention for synthesizing digital holograms, which is executed by a microprocessor MP associated with a memory MM, both shown in FIG. 2.

Figure 3:
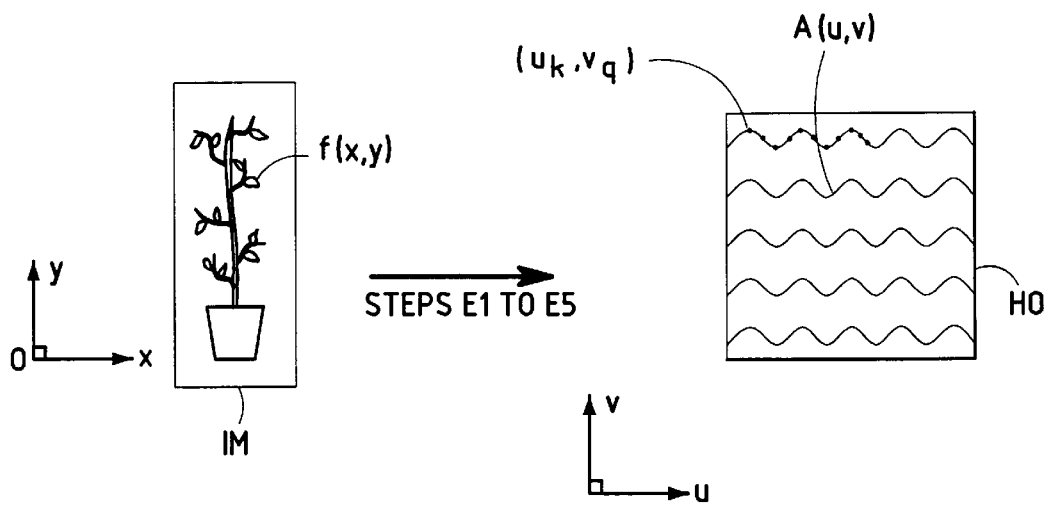
FIG. 3 illustrates the production of a hologram from a two-dimensional image.

In a preliminary step E0, a two-dimensional digital image IM, shown diagrammatically in FIG. 3, is stored in the memory MM associated with the microprocessor MP in the form of digital data. The two-dimensional image IM is typically defined by a real function of two variables, particularly by a distribution of intensities f(x,y), where (x,y) represent co-ordinates in a two-dimensional system of axes (O,x,y) associated with the image IM.

In a step E1, the two-dimensional image IM is transformed into a transformed two-dimensional image IM1 which is defined by an amplitude distribution by computing for each point of the image IM a value proportional to the square root of the corresponding intensity value.

In the next step E2, a "pseudorandom" diffuser is generated digitally. This diffuser consists of an "image" having the same number of pixels as the two-dimensional image IM and in which each pixel has an intensity value equal to 1 and a random phase. Each phase of the diffuser is then associated with a corresponding pixel of the transformed two-dimensional image IM1, to transform the image IM1 into a "complex" image IM2 in which a complex number defined by an amplitude value and a phase value is determined for each pixel. The pseudorandom diffuser prevents the resulting hologram HO, shown diagrammatically in FIG. 3, associated with the image IM, having excessive amplitude level disparities by averaging the amplitude values of the hologram.

Figure 4:
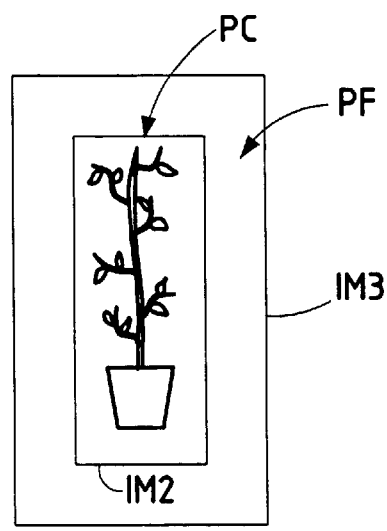
FIG. 4 shows the oversampling of a two-dimensional image by the algorithm shown in FIG. 1.

In a step E3 the complex image IM2 obtained in step E2 is oversampled, i.e. the image is included in a larger image, as shown in FIG. 4. An oversampled image IM3 is formed in this way consisting of the complex image IM2 in a central part PC and of pixels whose amplitude is chosen arbitrarily, for example equal to 0, in a complementary periphery part PF. This oversampling of the complex image IM2 increases the number of pixels of the resultant hologram HO and therefore improves its resolution.

Figure 5:
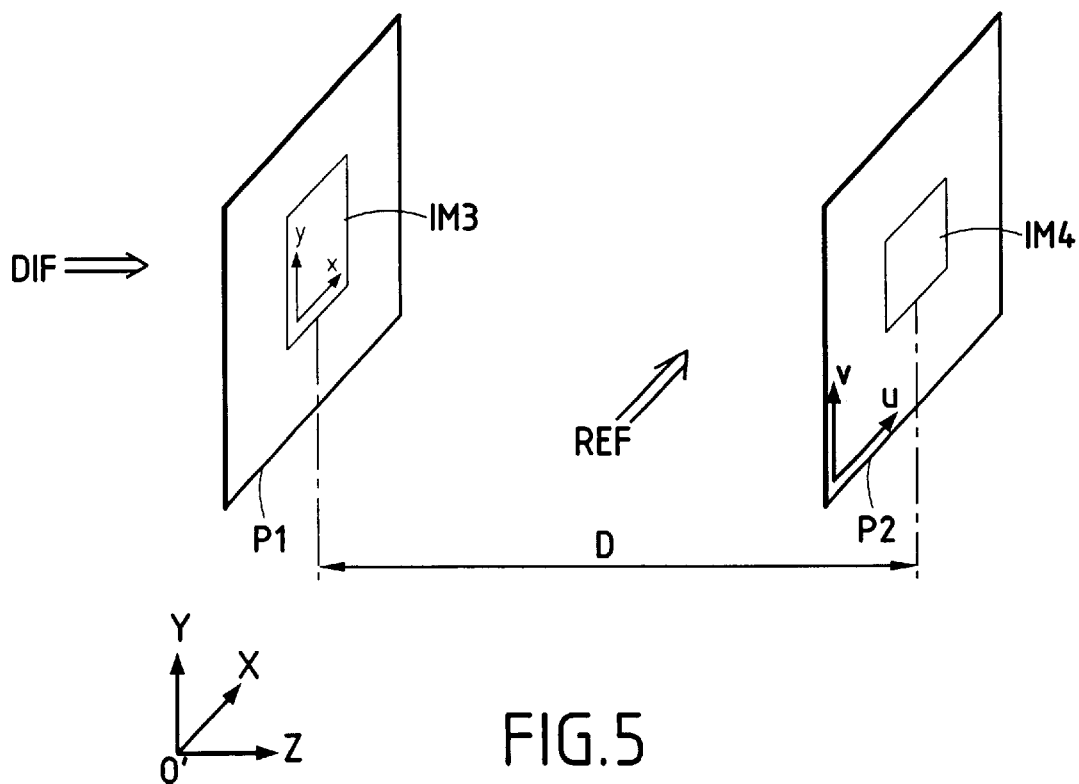
FIG. 5 is a diagram showing geometrical planes used in the algorithm shown in FIG. 1.

In a step E4, the production of a diffracted image IM4 resulting from the diffraction of a fictitious coherent optical wave DIF by the oversampled complex image IM3 is simulated digitally. To this end, first and second parallel and separate geometrical planes P1 and P2 are defined within a three-dimensional system of axes (O',X,Y,Z) as shown in FIG. 5. The first plane P1 includes the oversampled complex image IM3 and the second plane P2 constitutes the plane for computing the hologram HO. The production of the diffracted image IM4 can be simulated in a manner that is known in the art by applying a Fourier transform to the image IM3. In the method according to the invention, the diffracted image IM4 is preferably determined otherwise, namely by computing, in the plane P2, a convolutional product associated with the oversampled complex image IM3. This convolutional product conforms to scalar diffraction theory. For example, using a Rayleigh-Sommerfeld scalar diffraction formulation, the two components of the convolutional product can respectively correspond to a complex field representing the oversampled complex image IM3 and a complex field representing a spherical optical wave with the same wavelength as the optical wave DIF. The skilled person however knows other types of convolutional product for computing a diffracted image. The convolutional product computed in step E4 uses parameters including the distance D between the geometrical planes P1 and P2 and the wavelength of the coherent optical wave DIF.

In accordance with the invention, the convolutional product is computed by applying a complex transform, also referred to as a fast complex transform, to the two components of the convolutional product, computing the product of the resulting fast complex transforms, and then applying the fast complex transform which is the inverse of said fast complex transform to the aforementioned product of the fast complex transforms.

To be more precise, if CONV denotes the convolutional product, C1 and C2 its two components and T the fast complex transform, then the convolutional product is written:

$$CONV = C1 \otimes C2 = T^{-1}T(C1 \otimes C2)$$

$$CONV = T^{-1}(T(C1)T(C2)).$$

In the present context, the expression "fast complex transform" means a mathematical transform compatible with scalar optical diffraction theory, i.e. whose resulting transformed functions satisfy the conventional scalar diffraction equations. The fast complex transform must also have the property whereby the fast complex transform of a convolutional product of two components is equal to the product of the respective fast complex transforms of each of said two components. The Fourier transform, the orthogonal polynomial transform, the Paley transform, the Hadamar transform, the Walsh transform, the Hankel transform, the Karhunen-Loeve transform, the multiresolution discrete wavelet transform and the adaptive wavelet transform are all fast complex transforms which meet the above conditions. Other appropriate fast complex transforms are composites of at least two of the aforementioned transforms, such as a composite of the Walsh transform and the Hadamar transform. The application of a composite of two transforms T1 and T2 to any image I is defined in standard mathematical terms by the equation:

$$(T1 \cdot T2)(I) = T1(T2(I)).$$

Each of the aforementioned fast complex transforms can be used in a specific case. In particular, the fast complex transform can be chosen according to the distance D between the planes P1 and P2. A Fourier transform is appropriate for a large distance D. A Walsh transform is more suitable for a smaller distance D. Also, it has been found that using one of the above-mentioned fast complex transforms other than the Fourier transform gives better results in terms of the quality of the hologram HO than those obtained using the Fourier transform.

It should be noted that, because the two-dimensional image IM is transformed into a complex image IM2, computing the convolutional product associated with the image IM in step E4 is more practical than in the prior art since the fast complex transform is applied directly to an image IM3 defined by a complex function and not to an image defined by a real function.

At the exit from step E4, the diffracted image IM4 is defined by a complex field made up of a set of complex numbers each of which is associated with a point of the image IM4. Each of these complex numbers also depends on the image IM3 taken as a whole.

In a next step E5 a complex field simulating a reference optical wave REF with the same wavelength as the optical wave DIF and directed towards the hologram computation plane P2 is added, in the plane P2, to the complex field representing the diffracted image IM4. The amplitude information contained in the resulting complex field is then extracted in order to produce an interference field. The addition of the aforementioned two complex fields is performed by adding, at each point of the diffracted image IM4, the complex number associated with that point and the value at the same point of the complex field representing the reference wave REF. The interference field constitutes the hologram HO of the two-dimensional image IM.

Figure 1:
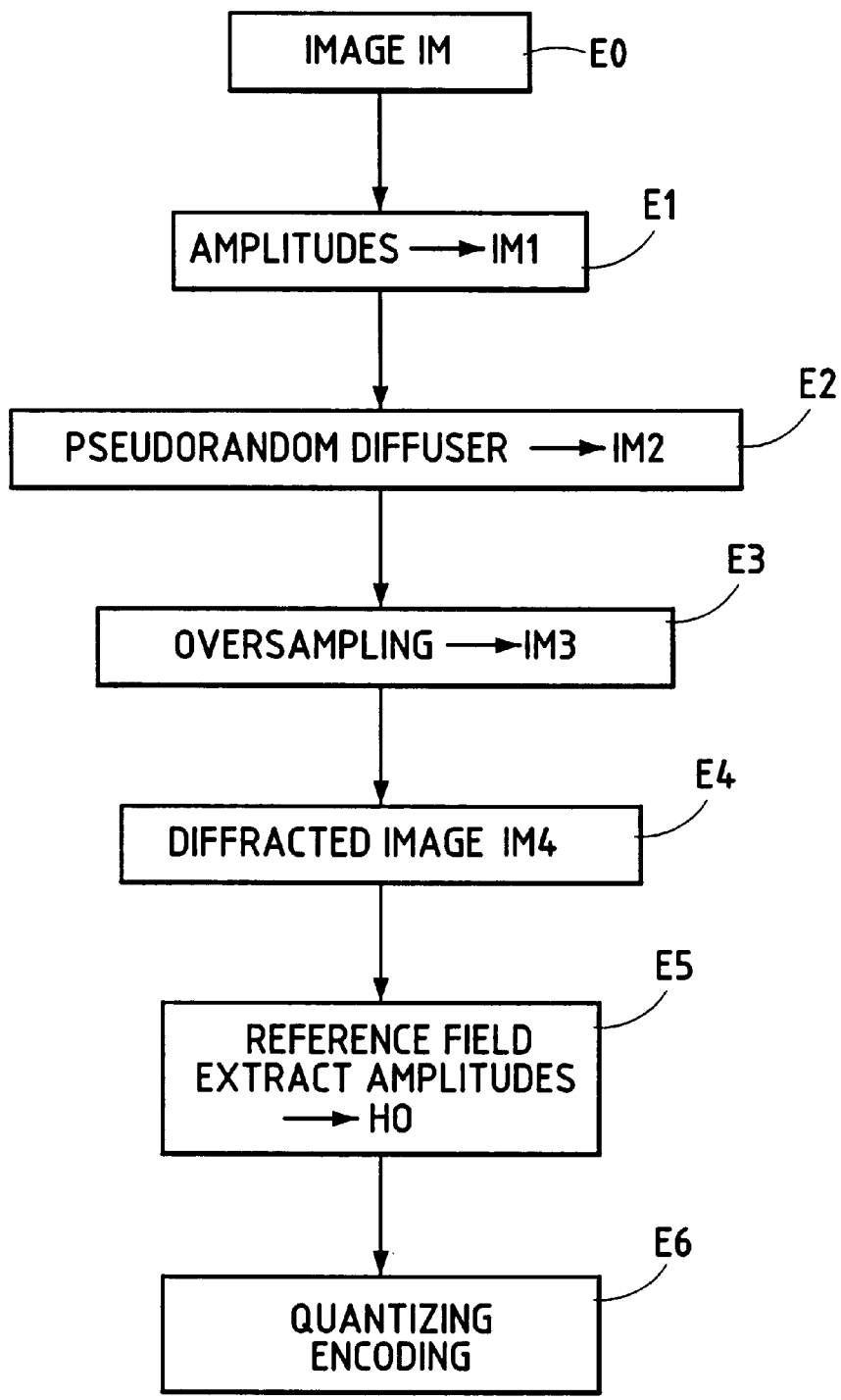
FIG. 1 is a flowchart of an algorithm according to the invention.
Figure 2:
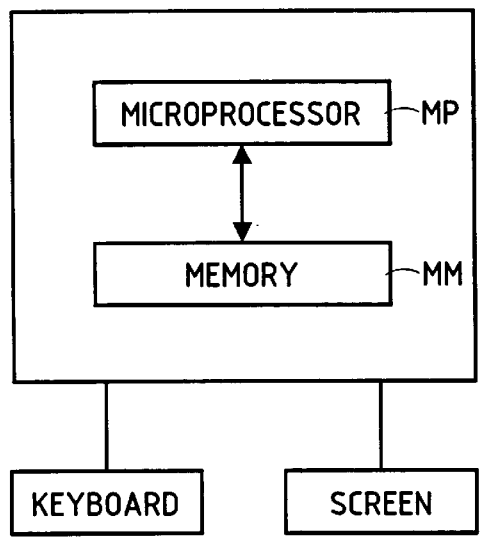
FIG. 2 is a block diagram of a computer executing the algorithm shown in FIG. 1.

A variant of the FIG. 1 algorithm dispenses with the steps E1 and E2 of producing the complex image IM2 and/or the oversampling step E3. In another variant, the oversampling step E3 precedes the step E1.

The hologram HO of the two-dimensional image IM obtained in step E5 is a diffractive field, or grating, which is computed for a particular wavelength, namely the wavelength of the optical waves DIF and REF. This hologram, which is present in virtual form in step E5, i.e. represented by digital data, is such that, if it is reproduced physically by a holographic screen, illuminating said holographic screen with a laser source emitting at the aforementioned wavelength reproduces the original two-dimensional image IM at a given order of diffraction.

The hologram HO obtained in step E5 is defined digitally by a two-dimensional amplitude function $A(u,v)$, where $(u,v)$ designate co-ordinates in the hologram computation plane P2 which correspond to image spatial frequencies when the fast complex transform chosen in step E4 is a Fourier transform, for example. The two-dimensional amplitude function $A(u,v)$ is deduced from the two-dimensional intensity function $f(x,y)$ describing the two-dimensional image IM, as explained above. In practice, the function $A(u,v)$ is computed only for a series of discrete points $(u,v)=(u_k, v_q)$, where k and q are integers. The values that the function $A(u,v)$ takes can nevertheless be spread continuously between a minimum amplitude value and a maximum amplitude value.

In a step E6 of the FIG. 1 algorithm, the values taken by the function $A(u,v)$ are quantized and encoded, i.e. each value of this function is associated with a discrete value which is encoded digitally, for example on eight bits. To each pair of discrete points $(u_k, v_q)$ there then corresponds a discrete amplitude value representing one of 256 gray levels. The amplitudes $A(u,v)$ can also be quantized more simply by allocating to each amplitude value of $A(u,v)$ the discrete value "0" if said amplitude value is below a predetermined threshold or the discrete value "1" if said amplitude value is above the predetermined threshold.

The encoding step E6 enables the hologram HO to be adapted to suit digital display systems, such as a digitally controlled liquid crystal screen, or to facilitate transmission of the hologram via telecommunication systems.

What is claimed is:

1. A method of producing a hologram from a two-dimensional image stored in a memory and defined by a real function, said method comprising the following steps:
   transforming the two-dimensional image defined by said real function into a complex two-dimensional image defined by a complex function,
   oversampling the two-dimensional image,
   simulating the production of a diffracted image resulting from the diffraction of an optical wave by the two-dimensional image, and
   producing said hologram by adding a complex field representing a reference optical wave to the resulting diffracted image.

2. A method according to claim 1, wherein the transforming step is carried out prior to the oversampling step.

3. A method according to claim 2, further comprising the step of encoding values taken by the amplitude of the sum of said complex field and the resulting diffracted image.

4. A method according to claim 2, wherein said transform step comprises the following steps:
   determining amplitude values each depending on the square root of a corresponding value taken by said real function, and
   associating a phase with each of said amplitude values so that an amplitude value and a phase value are defined for each point of the complex image.

5. A method according to claim 2, wherein said simulation step includes calculating a complex transform, said complex transform being a Fourier transform.

6. A method according to claim 2, wherein said simulation step includes computing one of the following complex transforms: Walsh transform, Hankel transform, orthogonal polynomial transform, Hadamar transform, Karhunen-Loeve transform, multiresolution discrete wavelet transform, adaptive wavelet transform, a transform which is a composite of at least two of the above transforms and a transform which is a composite of at least one of the above transforms and a Fourier transform.

7. A method according to claim 5, wherein said simulation step consists of computing a convolutional product, associated with the oversampled complex image, of two components, by applying the transform which is the inverse of said complex transform to the product of the respective complex transforms of said two components.

8. A method according to claim 1, wherein the transforming step is carried out after the oversampling step and prior to the simulating step.

9. A system for producing a hologram from a two-dimensional image stored in a memory and defined by a real function, characterized in that it comprises:
    transform means for transforming the two-dimensional image defined by said real function into a complex two-dimensional image defined by a complex function,
    means for oversampling the complex image,
    simulator means for simulating the production of a diffracted image resulting from the diffraction of an optical wave by the oversampled complex image, and
    means for producing said hologram by adding a complex field representing a reference optical wave to the resulting diffracted image.

10. A system according to claim 9, further comprising means for encoding values taken by the amplitude of the sum of said complex field and the diffracted image.

11. A system according to claim 9, wherein said transform means comprise:
    means for determining amplitude values each depending on the square root of a corresponding value taken by said real function, and
    means for associating a phase with each of said amplitude values so that an amplitude value and a phase value are defined for each point of the complex image.

12. A system according to claim 9, wherein said simulator means comprise means for computing a complex transform, said complex transform being a Fourier transform.

13. A system according to claim 9, wherein said simulator means comprise means for computing one of the following complex transforms: Walsh transform, Hankel transform, orthogonal polynomial transform, Hadamar transform, Karhunen-Loeve transform, multiresolution discrete wavelet transform, adaptive wavelet transform, a transform which is a composite of at least two of the above transforms and a transform which is a composite of at least one of the above transforms and a Fourier transform.

14. A system according to claim 12, wherein said simulator means comprise means for computing a convolutional product, associated with the oversampled complex image, of two components, by a applying the transform which is the inverse of said complex transform to the product of the respective complex transforms of said two components.

15. A system for producing a hologram from a two-dimensional image stored in a memory and defined by a real function, characterized in that it comprises:
    means for oversampling the two-dimensional image,
    transform means for transforming the oversampled two-dimensional image into a complex two-dimensional image defined by a complex function,
    simulator means for simulating the production of a diffracted image resulting from the diffraction of an optical waveby the oversampled complex image, and
    means for producing said hologram by adding a complex field representing a reference optical wave to the resulting diffracted image.

16. A method of producing a hologram from a two-dimensional image which is in the form of digital data stored in a memory, the method comprising the following steps:
    simulating the production of a diffracted image resulting from the production of an optical wave by the two-dimensional image, and
    producing said hologram by adding a complex field representing a reference optical wave to the resulting diffracted image,
    characterized in that the simulating step consists of computing a convolutional product, associated with the two-dimensional image, of two components, by applying a complex transform to the two components so as to obtain two respective transforms, and by further applying the transform which is the inverse of said complex transform to the product of said transforms.

17. A method according to claim 16, characterized in that said complex transforms is a transform from the group consisting of a Walsh transform, a Hankel transform, a Paley transform, an orthogonal polynomial transform, a Hadamar transform, a Karhunen-Loeve transform, a multiresolution discrete wavelet transform, an adaptive wavelet transform, a transform which is a composite of at least two of the above transforms, a transform which is a composite of at least one of the above transforms, and a Fourier transform.

18. A method according to claim 16, characterized in that said complex transform is a Fourier transform.

19. A method according to claim 16, characterized in that the two-dimensional image is defined by a real function, and that the method comprises, prior to the simulating step, the step of transforming the two-dimensional image defined by said real function into a complex two-dimensional image defined by a complex function.

20. A method according to claim 19, characterized in that said step of transforming the two-dimensional image into a complex two-dimensional image comprises the following steps:
    determining amplitude values each depending on the square root of a corresponding value taken by said real function, and
    associating a phase with each of said amplitude values so that an amplitude value and a phase value are defined for each point of the complex image.

21. A method according to claim 16, characterized in that it comprises, prior to the simulating step, the step of oversampling the two-dimensional image.

22. A method according to claim 21, in that the oversampling step is carried out after said step of transforming the two-dimensional image into a complex two-dimensional image.

23. A method according to claim 16, further comprising the step of encoding values taken by the amplitude of the sum of said complex field and the resulting diffracted image.

24. A method according to claim 16, characterized in that the two components of the convolutional product respectively correspond to a complex field representing the two-dimensional image and to a complex field representing a spherical optical wave.

25. A system for producing a hologram from a two-dimensional image stored in a memory, comprising:
   means for simulating the production of a diffracted image resulting from the production of an optical wave by the two-dimensional image, and
   means for producing said hologram by adding a complex field representing a reference optical wave to the resulting diffracted image,
   characterized in that the simulating means comprise means for calculating a convolutional product, associated with the two-dimensional image, of two components, by applying a complex transform to the two components so as to obtain two respective transforms, and by further applying the transform which is the inverse of said complex transform to the product of said transforms.

26. A system according to claim 25, characterized in that said complex transforms is a transform from the group consisting of a Walsh transform, a Hankel transform, a Paley transform, an orthogonal polynomial transform, a Hadamar transform, a Karhunen-Loeve transform, a multiresolution discrete wavelet transform, an adaptive wavelet transform, a transform which is a composite of at least two of the above transforms, a transform which is a composite of at least one of the above transforms, and a Fourier transform.

27. A system for according to claim 25, characterized in that said complex transform is a Fourier transform.

28. A system for according to claim 25, characterized in that it further comprises means for transforming the two-dimensional image defined by a real function, into a complex two-dimensional image defined by a complex function.

29. A system for according to claim 28, characterized in that said means for transforming the two-dimensional image into a complex two-dimensional image comprises:
   means for determining amplitude values each depending on the square root of a corresponding value taken by said real function, and
   means for associating a phase with each of said amplitude values so that an amplitude value and a phase value are defined for each point of the complex image.

30. A system for according to claim 25, characterized in that it further comprises means for oversampling the two-dimensional image.

31. A system for according to claim 25, characterized in that it further comprises means for encoding values taken by the amplitude of the sum of said complex field and the resulting diffracted image.

32. A system for according to claim 25, characterized in that the two components of the convolutional product respectively correspond to a complex field representing the two-dimensional image and to a complex field representing a spherical optical wave.

* * * * *